March 9, 1943. J. A. VOGEL 2,313,604
TREE REMOVING AND TRANSPLANTING APPARATUS
Filed April 29, 1941 3 Sheets-Sheet 1

Inventor:
Joseph A. Vogel,
By
Attorney.

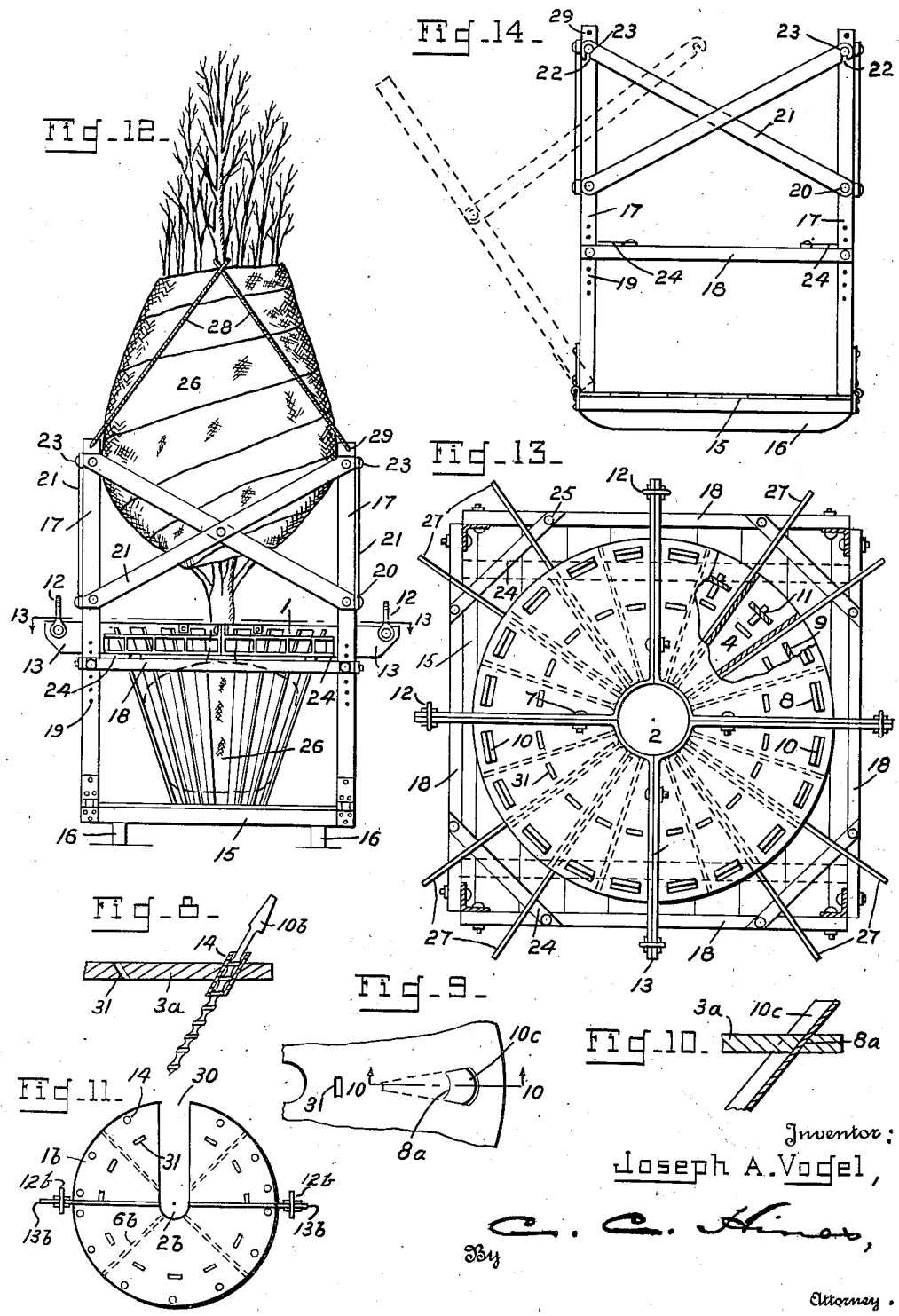

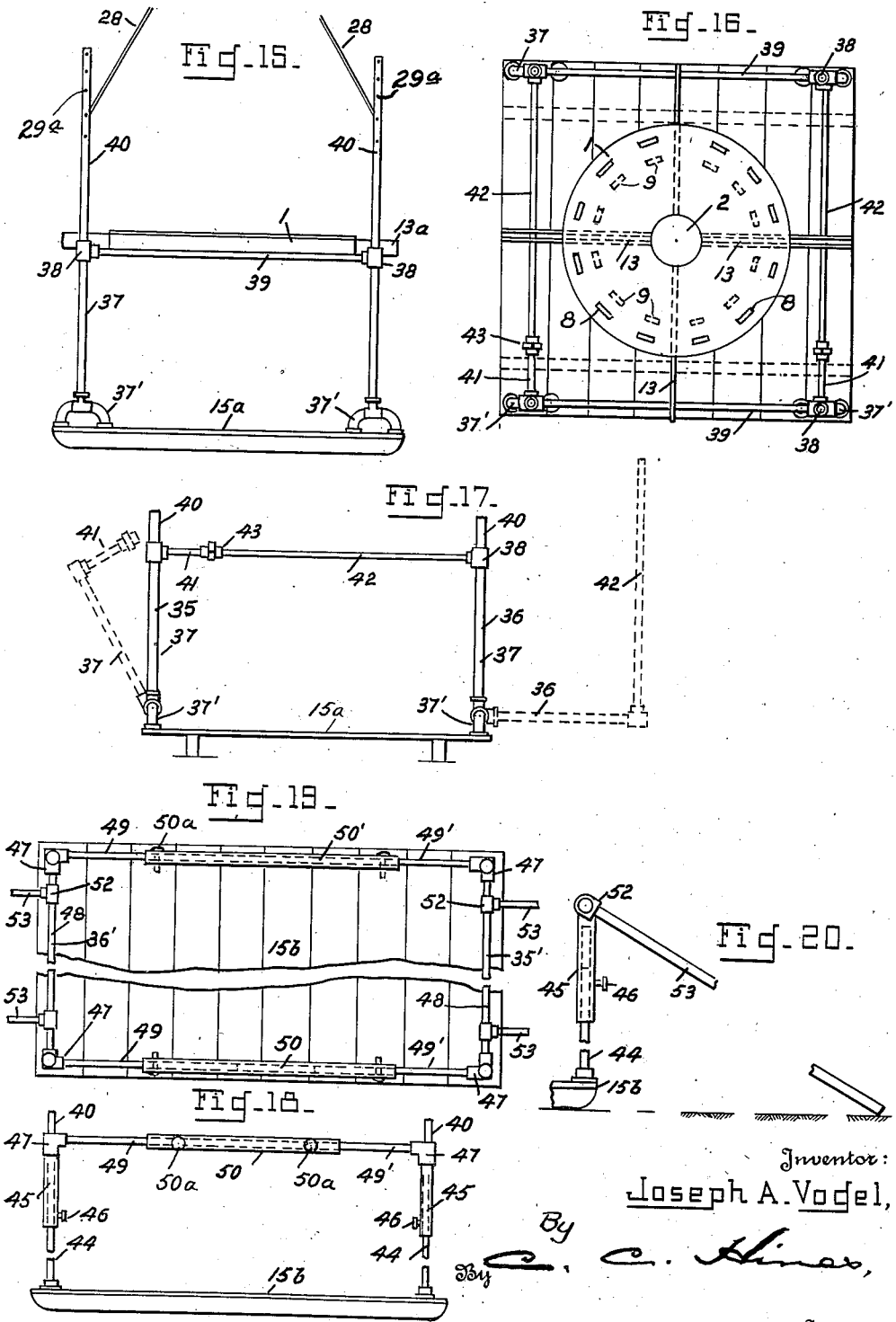

Patented Mar. 9, 1943

2,313,604

UNITED STATES PATENT OFFICE 2,313,604

TREE REMOVING AND TRANSPLANTING APPARATUS

Joseph A. Vogel, Wilmington, Del.

Application April 29, 1941, Serial No. 391,005

14 Claims. (Cl. 47—37)

This invention relates to improvements in apparatus for use in removing trees and the like from the ground, supporting the removed tree while its root ball is being wrapped, transporting the tree if desired by the supporting means to a truck or other vehicle, transplanting the tree, and preparing a hole in the ground for the reception of a tree which is being transplanted.

One object of the invention is to provide novel and improved means for separating the roots of a tree with surrounding earth from the ground in a ready, convenient and expeditious manner and so that trees of even large size may be removed and prepared for shipment and transplanting without injury to the tree.

Another object of the invention is to provide novel and improved means whereby the roots of the tree and surrounding earth withdrawn therewith may be readily wrapped to protect the root ball, and whereby the tree may be separated from the digging or extracting means for shipment and transplanting, without injury to the roots or breaking the root ball.

Still another object of the invention is to provide a digging or extracting device which may also be employed for digging a hole to receive a tree to be transplanted and which may be readily connected with hoisting means used for convenience in lifting, lowering or otherwise handling the tree.

Still another object of the invention is to provide a supporting and transporting device which may be used to support the tree and digging or extracting device while the digging and extracting device is being detached from the removed tree in such manner as to prevent breakage of the earth ball and to allow a protective wrapping to be conveniently applied, and whereby after the root ball has been wrapped the tree if desired may be moved from the removal site to a truck or other transport vehicle.

Still another object of the invention is to provide a sectional digging and extracting device and supporting device having members movable into and out of operative position whereby reception and release of the tree to be wrapped and transported is facilitated while protection to the tree is afforded.

With these and other objects in view, the invention consists of the features of construction, combination and arrangement of parts, hereinafter fully described and claimed, reference being had to the accompanying drawings, in which:

Fig. 8 is a section similar to Fig. 7 showing the use of an auger as a ground breaking element.

Fig. 9 is a plan view of part of the digger showing a construction for the use of curved blade slots and blades.

Fig. 10 is a section on line 10—10 of Fig. 9.

Fig. 11 is a plan view on a reduced scale of still another modified form of digger or extractor.

Fig. 12 is a view in elevation of a digger or extractor and digger supporting and releasing device showing a tree in position for removal.

Fig. 13 is a sectional plan view on line 13—13 of Fig. 12.

Fig. 14 is a view in elevation of the supporting device looking toward a side thereof at right angles to that shown in Fig. 11.

Figs. 15, 16 and 17 are views similar to Figs. 12, 13 and 14 of a modified form of the supporting device.

Figs. 18 and 19 are respectively a fragmentary plan view partly broken away and a view in side elevation of still another modified form of the supporting device.

Fig. 20 is a fragmentary side elevation of the supporting device shown in Figs. 18 and 19 looking toward a side at right angles to that shown in Fig. 18.

Figure 1:
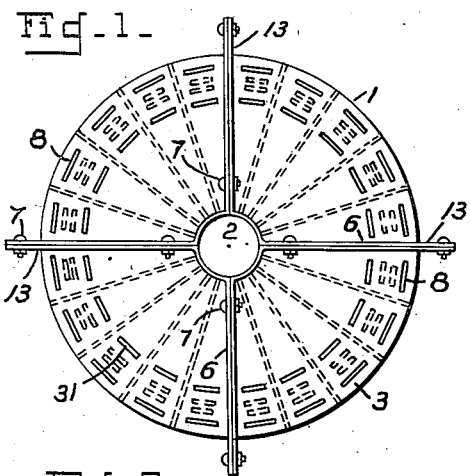
Fig. 1 is a top plan view of a digger or extractor embodying my invention.
Figure 4:
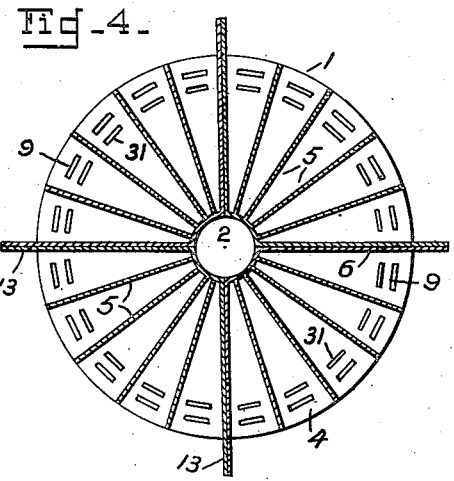
Fig. 4 is a section on line 4—4 of Fig. 2.
Figure 2:
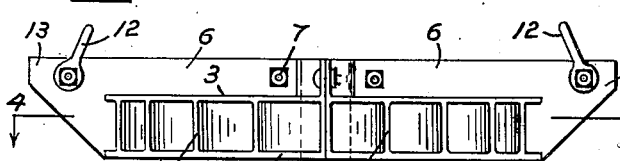
Fig. 2 is a side elevation of the same.
Figure 5:
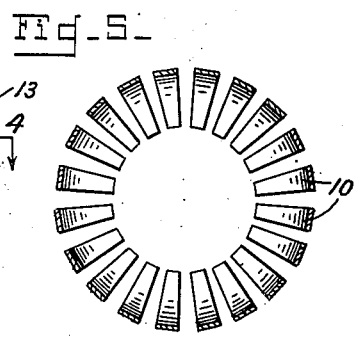
Fig. 5 is a section on line 5—5 of Fig. 3.
Figure 3:
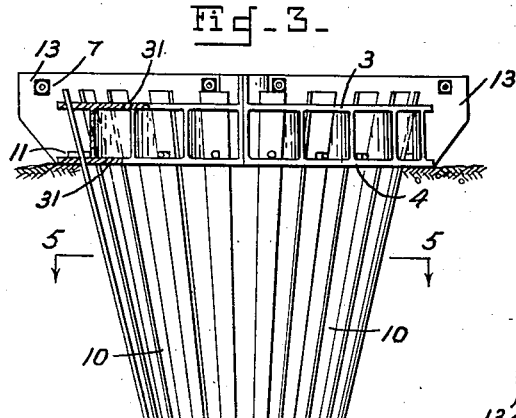
Fig. 3 is a side elevation partly in vertical section of the digger or extractor as arranged for use in extracting a tree.

In carrying my invention into practice in the forms shown in Figs. 1 to 5, inclusive, I provide a plate-like tree digger or extractor comprising a lifting head 1 of circular form and having a central opening 2. This head is preferably formed of a pair of similar upper and lower plate members 3 and 4 which are suitably spaced from each other. Each of these plates is divided radially at angles of 90° to form the plate into quadrants or quarter sections or segments, the similar quadrants or sections of each plate being rigidly united by radially arranged ribs 5 which are welded to the plate sections. The head as thus constructed is composed of double plate sections adapted to be nested or fitted together to form the circular lifting plate. The plates are also provided along their meeting edges with ribs 6 which extend upwardly and downwardly above and below the upper and lower faces of the respective plates and are apertured for the passage of bolts 7 whereby the sections of the head are adapted to be fastened in assembled condition.

The head 1 is adapted to be disposed on the ground so as to encircle the trunk or stem of the tree which is to be extracted, the opening 2 being provided for the passage of said trunk or stem upwardly through the head. The sectional construction of the head adapts it when its sections are disconnected to be fitted in position on the ground about the tree stem or trunk, after which its sections are bolted together to hold them assembled for the extracting action. The described construction of the head provides a head which is extremely strong and rigid and may be made of large dimensions for the extraction and lifting of even large trees without danger of the head bending or buckling.

The upper plate 3 of the head is provided adjacent to its periphery with an annular series of slots 8, while the lower plate 4 is provided with an annular series of similar slots 9, the slots 9 in the plate 4 being arranged somewhat closer to the opening 2 or axial center of the head than the slots 8. The slots 8 and 9 are disposed in properly spaced relation about the plates between the reinforcing ribs and form guides for the reception and downward passage of the ground breaking or piercing blades or members 10. After the lifting head plates have been assembled upon the ground about the tree the ground breaking or piercing members 10 are driven downwardly through the sets of coacting slots 8 and 9 in the plates 3 and 4 so as to enter the earth about the roots of the tree to a proper depth below the surface. After these ground breaking or piercing members 10 are driven downwardly, retaining pins 11 or the like are passed through openings therein so that they may bear upon the plate 4 to support and hold said ground breaking or piercing members against further downward movement or displacement. The slots 8 and 9 are so arranged as to guide the members 10 at an inward and downward angle into the ground so that said members will be arranged to form an inverted frusto-conical basket enclosing and separating from the ground the roots and the earth in which the roots are embedded to form the earth or root ball. The pins 11 hold the members 10 from displacement in the subsequent operation of lifting the tree trunk or stem and formed root ball from the ground. Since the plates 3 and 4 support and guide the blades at spaced points pivotal movements of the blades are prevented while they are being driven and the blades are firmly braced against movement out of position or liability of being broken.

In order to adapt the lifting head and the severed tree to be conveniently removed from the ground, clevices, lifting links or like fittings 12 may be secured to the flanges 6 by their attaching bolts 7, so that a hoisting boom or hoisting gear of any suitable type may be applied to the lifting head for the lifting action. I also preferably provide the flanges 6 with extensions 13 projecting beyond the periphery of the lifting head and serving as arms to which the hoisting gear or steadying ropes or cables may be attached, and which also serve to support the head within a supporting device during the operation of wrapping the root ball and removing the lifting head after the tree has been lifted out of the ground.

While the lifting head is preferably formed, as above described, of four sections and of upper and lower plates the similar sections of which are rigidly united in the manner described, I may, particularly where the head is of small size, construct it of a lesser number of sections, that is, of either two sections or three sections, and under some conditions I may also construct the lifting head of a single plate instead of a pair of superposed plates.

Figure 6:
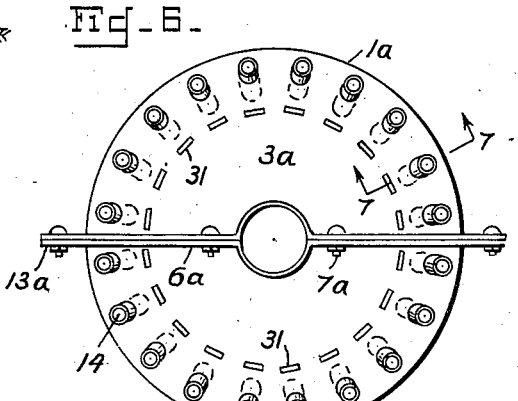
Fig. 6 is a plan view of a modified form of digger or extractor.
Figure 7:
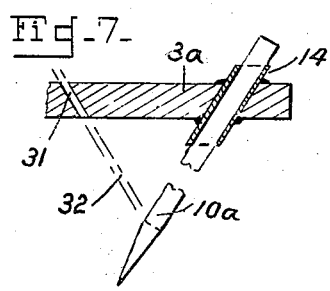
Fig. 7 is a section on line 7—7 of Fig. 6 showing the use of a ground breaking element and a cutting blade.

In Figs. 6 and 7 I have shown a modified form of digger or extractor 1a which comprises a single plate 3a of suitable size constructed of two half sections provided along their meeting edges with flanges 6a apertured for the attachment of fastening bolts 7a and which may be provided with extensions 13a forming supporting and steadying arms. This modified form of lifting head is shown as provided adjacent to its periphery with openings 11a in which are welded guide tubes 14 for the passage of ground breaking or piercing elements 10a, which may consist of rods or pipes of a suitable length and which are designed to perform the same function as the breaking or piercing elements 10 above described. The guide tubes 14 may also serve for the guidance and passage of augers 10b, as shown in Fig. 8, serving as ground breaking or piercing elements. Also, as shown in Figs. 9 and 10, slots 8a of arcuate form may be employed to receive arcuately curved blades 10c, allowing blades of greater strength than straight blades to be used.

The lifting head may also, if desired, be formed of a single non-sectional plate. Such a plate or head 1b is shown in Fig. 11. This plate or head is of circular form and is provided with a central opening 2b and a radial slot 30 extending therefrom to and through one side of the head, said slot permitting the head to be moved laterally into and out of engagement with the tree stem or trunk. This head is or may be provided with slots, as 8, or tubes, as 14, for the passage of ground breaking or piercing members of the types described. It also is or may be provided with stiffening ribs 6b, extension arms 13b and lifting links or equivalent lifting means 12b. This type of head may be used whenever it is desired or possible to use a head of small size or large size but light weight.

The digger or extractor of any of the forms shown or as equivalently constructed may also be used for the digging of a hole in the ground to form a hole of suitable size and shape to receive the root ball of a tree to be transplanted therein.

In any of the forms of diggers and extractors above described there may be provided openings 31 for the passage of cutter blades 32 at an inward and downward angle to cut away the excess earth at the upper portion or corners of the root ball.

I provide for use with the digger or extractor a supporting device whereby the lifting head and extracted tree may be supported to allow the root ball to be wrapped with a protective covering and the lifting head to be moved and the tree subsequently transported if desired to a new site or to a transport vehicle without liability of injury to the tree roots or loss of the ball of earth about the same.

This supporting and transporting device, as shown in Figs. 13, 14 and 15, comprises a rectangular platform 15 mounted on base supports 16. Hinged at their lower ends to the corners of the platform are angle metal corner posts or uprights 17. These posts are adapted to be swung outwardly to a horizontal position and upwardly to a vertical position and connected and held in the latter-named position by tie bars 18. The bars 18 are adapted to be secured to the posts at a suitable height above the platform 15 and below the upper ends of the posts. To enable this height to be varied within determined limits the posts are provided each with a series of spaced openings 19 for the reception of bolts 20 which are also passed through the bars to adjustably secure the bars in position at the proper level above the platform. At each side of the frame a pair of spaced stay bars 21 are also provided and adapted to be secured in crossing relation or X-fashion to stay the upper ends of the posts. Each stay bar is pivoted at its lower end to one of the posts at its side of the frame and provided at its free end with a slot 22 to engage a headed fastening pin or stud 23 on the opposite post at the same side of the frame. Diagonal stay bars 24 may be used and extended across between the tie bars at the corners of the frame thus formed and secured to the tie bars by bolts or pins 25. The posts and bars form an enclosing frame down into which the digger and extractor enclosing the root ball of the extracted tree may be lowered by the hoisting means until the lower ends of the piercing members 10 are brought to rest upon the platform 15 and the arms 13 of the supporting head are brought to rest upon the tie bars 18, whereby the weight of the tree and lifting head will be supported and removed from the root ball and injury to the roots and loosening of the surrounding earth prevented.

Prior to the operation of lowering the extracted tree onto the platform 15 a wrapping 26 of burlap or other suitable material is laid on the platform so that it will be in position to be wrapped about the root ball when the digger or extractor is released therefrom. Also prior to the release of the digger or extractor, brace bars or weight sustaining bars 27 are preferably rested on the braces and extended into the spaces between the plates of the lifting head sections, as shown in Fig. 13, to sustain the weight of the lifting head sections and guide them as they are being released. To release the digger or extractor the fastening bolts 7 which unite its sections are removed and the lifting head sections with their attached piercing members 10 shifted outward toward the corners of the frame, after which the piercing members 10 and lifting head sections may be readily lifted out and removed, thus freeing and exposing the tree roots and earth. The tree may then be lowered onto the platform and the wrapper 26 then applied and secured about the root ball to hold the same intact and prevent injury thereto during further handling of the tree. To steady the tree and assist in supporting it while being lowered into the frame and held therein and wrapped, suitable stays 28 engaged with openings 29 in the posts may be fastened to the tree for the purpose. The burlapped tree may then be released from the supporting device by opening up the frame thereof in an obvious manner and then lifting the tree onto a transport truck or other vehicle or the frame may be left in a set up condition and the tree transported therein and thereby to a transport truck or vehicle on which it is to be loaded and shipped to a transport point. If the supporting device is intended to be used also for transporting the tree to a nearby car or vehicle the base supports 16 may be in the form of skids or sled runners.

In Figs. 15, 16 and 17 I have shown a modified form of supporting device which is largely constructed of tubing or piping. This comprises a platform base 15a and frame members 35 and 36 of generally similar construction and adapted to be swung upwardly and conected to enclose the root ball of the tree and adapted to be disconnected and swung outwardly to release the tree. As shown, each frame member comprises a pair of corner posts or tubes 37 hinged at their lower ends, as at 37', to the platform and provided at their upper ends with four-way fittings or couplings 38. These posts of each frame member are connected and braced by a cross member or arm 39 connected with the fittings. The fittings also provide for the connection with the posts of tubes 40 forming upward extensions thereof to guide the tree in position and which may be provided with apertures 29a for the attachment thereto of the tree stays 28. To the posts of one of the frame members, as the frame member 35, are attached, by the coupling 38, tubes 41, and the posts of the other frame member 36 are similarly attached arms or tubes 42, which are arranged on the inner sides of said frame members, at right angles thereto, and so as to extend toward each other when the frame members are in an upright position. These arms form coupling arms to connect the frame members 35 and 36 and serve also to form the sides of the frame at right angles to the sides formed by said frame members. These arms 41 and 42 are adapted to be united by suitable rotatable and threaded couplings 43 to hold the frame members united or set up to form the enclosing frame. When the frame is set up the lifting head may be lowered thereinto and rested by its supporting members on the tubes or arms 39 and the connected arms or tubes 41, 42. If a sectional head is used the head sections when uncoupled may be slid outwardly on the arms to open the head for release of the tree. Fig. 17 shows in dotted lines the manner in which the sides 35 and 36 are swung outward to open up the support for the spreading of the root ball wrapper on the platform and to allow more ready removal of the head, excess earth and wrapped tree. The coupling arms 41 of one of the frame sides, as the arms of the frame side 35, may be made shorter than the coupling arms 42 of the other frame side, to facilitate these actions.

Figs. 18, 19 and 20 show another construction of the support which comprises a platform base 15b having corner rods or tubes 44 fixed to the platform and supporting vertically adjustable frame sides 35' and 36'. Each of these frame sides consists of a pair of corner tubes or posts 45 telescoping over a pair of the rods 44 and adapted to be adjustably secured thereto by screws or fastening pins 46, a four-way coupling 47 at the upper end of each corner tube, and a cross rod or tube 48 secured to the couplings of and connecting the pair of corner tubes of said frame side. Also secured to the couplings of the respective frame sides 35' and 36' are tubes or rods 49, 49' which extend inwardly therefrom and telescope within tubular coupling sleeves 50, 50' which connect the opposed corner posts of the side frames 35', 36' together and form with said posts the frame sides at right angles to said sides 35', 36'. Suitable fastenings 59a may be provided to secure the tubes 49, 49' and sleeves 50, 50' together. This construction provides a rectangular supporting frame which may be adjusted to suit different heights of trees and which comprises parts which may be lifted off the base support and uncoupled for ready transportation and handling and coupled together for use. Extension rods or pipes 40 similar to those shown in Figs. 15, 16 and 17 may be applied to the couplings 47 to increase the height of the frame and to serve as guides and stays for the tree. The set up frame is designed to be used as a support for the lifting head and to allow removal of the head from the tree in the same manner as that described in connection with the supports previously described. To the cross tubes or rods 48 of each frame side 35', 36', may be pivoted, as by sleeves 52, a pair of rods 53 which are slidably adjustable toward and from each other to vary the distance between them. These rods may be swung inwardly over upon the frame to dispose them in an out of the way position for convenience in conveying the support from place to place, and the rods may be swung outwardly to the inclined position shown in Fig. 20 to serve as a slideway down which a lifting head being removed from the frame may be slid with facility.

From the foregoing description, taken in connection with the drawings, the construction and mode of use of my improved tree removing and transplanting apparatus will be readily understood, and it will be seen that the invention provides a tree excavating and lifting device and coacting supporting means whereby a tree may be readily excavated with a proper amount of earth about its roots and then lifted out of the ground and supported while the excavator and lifter is being removed and a wrapping is being applied without injury to the roots or breakage of and loss of the earth surrounding its roots, so that the tree may be raised and readily put in best condition for shipment and transplanting. Also it will be seen that the invention provides an excavator and lifter which may be readily and conveniently applied for use in excavating and lifting a tree and removed to release the tree and which may be made of large size and great strength for use in excavating and lifting trees of large size. Furthermore, it will be seen that the invention provides a novel and efficient construction of supporting and transporting device by which the weight of the excavator and lifter and the tree may be sustained to prevent injury to the tree during the process of removing the excavator and lifter, and also by which the tree may be transported from the removal site to a transport vehicle for shipment.

While the constructions disclosed for these purposes are preferred, it will be understood that changes in the arrangement, construction and form of the parts may be made within the scope of the appended claims, without departing from the spirit or sacrificing any of the advantages of the invention.

What I claim is:

1. A tree excavating and lifting device comprising an annular plate like lifting head formed of radially divided sections adapted to be coupled together for use about a tree and uncoupled for removal from the tree, said head having an annular series of openings therein for the passage of ground piercing members and being provided with supporting arms projecting outwardly beyond the periphery of the head.

2. A tree excavating and lifting device comprising a plate like annular lifting head formed of radially divided sections adapted to be coupled together for use about a tree and uncoupled for removal from the tree, said head having an annular series of openings therein and said sections being provided with coupling flanges along their meeting edges adapted to be connected to couple them together, said flanges extending outwardly beyond the peripheries of the sections to form supporting and lifting arms, and ground piercing members adapted to be driven downward through said openings at an inward and downward angle to the head.

3. A tree excavating and lifting device comprising a plate like annular lifting head formed of radially divided sections adapted to be coupled together for use about a tree and uncoupled for removal from the tree, said head having an annular series of slots adjacent to its periphery for the passage of ground piercing members at an inward and downward angle to the axis of the head, and abutment flanges along the meeting edges of said sections adapted to be connected to couple them together.

4. A tree excavating and lifting device comprising a plate like annular lifting head formed of radially divided sections each consisting of spaced upper and lower plates and radial ribs spacing said plates and rigidly connecting them together, said plates being provided with openings adjacent to their peripheries and having coupling flanges extending along their meeting edges and projecting beyond the peripheries of the sections to form supporting arms, and ground piercing members adapted to be driven downward through said openings in an inward and downward angle to the head.

5. In a tree transplanting apparatus, an excavator and lifter comprising a head formed of spaced upper and lower plates and adapted to be engaged with and disengaged from about the stem of a tree, said head having a central opening for passage of the tree stem and an annular series of openings concentric with the central opening for the passage of ground piercing members at an inward and downward angle to sever the earth about the tree roots from the surrounding terrain and form a root ball, and ground piercing members adapted to be inserted into and withdrawn from said series of openings.

6. In a tree transplanting apparatus, an excavator and lifter comprising a head adapted to be engaged with and disengaged from about the stem of a tree, said head having a central opening for passage of the tree stem and an annular series of openings concentric with the central opening for the passage of ground piercing members at an inward and downward angle to sever the earth about the tree roots from the surrounding terrain and form a root ball, and supporting arms extending outwardly from the head and lying substantially in the plane of the head and provided with means for the engagement of lifting means therewith.

7. In a tree transplanting apparatus, an excavator and lifter comprising a head adapted to be engaged with and disengaged from about the stem of a tree, said head having a central opening for passage of the tree stem, an annular series of openings concentric with the central opening for the passage of ground piercing members at an inward and downward angle to sever the earth about the tree roots from the surrounding terrain and form a root ball, and an annular series of openings for the passage of cutter blades at a downward and outward angle to remove earth from the top of the root ball.

8. In a tree transplanting apparatus, an excavator and lifter comprising a head adapted to be engaged with and disengaged from about the stem of a tree, said head having a central opening for passage of the tree stem, an annular series of openings concentric with the central opening for the passage of ground piercing members at an inward and downward angle to sever the earth about the tree roots from the surrounding terrain and form a root ball, an annular series of openings for the passage of cutter blades at a downward and outward angle to remove earth from the top of the root ball, and supporting arms extending outwardly from the head.

9. A tree excavating and lifting device comprising a plate-like annular head formed of radially divided sections, said sections being constructed to define a central tree receiving opening and being provided with an annular series of openings concentric with the central opening for the passage of ground piercing members at an inward and downward angle to the head, abutment flanges extending along the meeting edges of the sections and adapted for attachment to each other to couple the sections together, said flanges being provided with extended portions forming arms projecting beyond the head, and attachments carried by said arms for the connection therewith of lifting devices.

10. A tree excavating and lifting device comprising a plate-like annular head formed of radially divided sections, each consisting of an upper plate and a lower plate and radial ribs disposed between and spacing and rigidly connecting said plates, said sections being constructed to define a central opening for passage of the tree stem and being apertured to provide an annular series of openings concentric with the central opening for the passage of ground piercing members at an inward and downward angle to the head, coupling flanges extending along the meeting edges of the sections and adapted to be connected to couple them together, said coupling flanges being provided with extensions projecting beyond the periphery of the head and forming supporting arms, and lifting elements carried by said arms for the connection of lifting means therewith.

11. A tree excavating and lifting device comprising a lifting head plate adapted to be engaged with and disengaged from about the stem of a tree, said plate having a central opening for passage of the tree stem and an annular series of openings concentric with the central opening for the passage of ground piercing members at an inward and downward angle to sever the earth about the tree roots from the surrounding terrain and form a root ball, stiffening ribs formed on the plate and extending radially from the central opening toward the periphery of the plate, and supporting and lifting arms extending outward from the periphery of the plate and provided with means for the attachment of lifting elements thereto.

12. A tree excavating and lifting device comprising a lifting head plate adapted to be engaged with and disengaged from about the stem of a tree, said head having a central opening for passage of the tree stem and an annular series of openings concentric with the central opening for the passage of ground piercing members at an inward and downward angle to sever the earth about the tree roots from the surrounding terrain and form a root ball, stiffening ribs formed on the plate and extending radially in opposite directions from the central opening toward the periphery of the plate, and supporting arms projecting beyond the periphery of the plate and forming extensions of the ribs, said arms being provided with means for the attachment of lifting elements thereto.

13. A tree excavating and lifting device comprising a lifting head plate adapted to be engaged with and disengaged from about the stem of a tree, said plate having a central opening for passage of the tree stem, an outer annular series of openings concentric with the central opening for the passage of ground piercing members at an inward and downward angle to sever the earth about the tree roots from the surrounding terrain and form a root ball and an inner annular series of openings for the passage of cutter blades to remove earth from the top of the root ball, and stiffening ribs formed on the plate and extending radially from the central opennig in opposite directions to the periphery of the plate.

14. A tree excavating and lifting device comprising a lifting head plate adapted to be engaged with and disengaged from about the stem of a tree, said plate having a central opening for passage of the tree stem, an outer annular series of openings concentric with the central opening for the passage of ground piercing members at an inward and downward angle to sever the earth about the tree roots from the surrounding terrain and form a root ball and an inner annular series of openings for the passage of cutter blades to remove earth from the top of the root ball, stiffening ribs formed on the plate and extending radially in opposite directions from the central opening toward the periphery of the plate, and supporting arms projecting beyond the periphery of the head and provided with means for the attachment of lifting elements thereto.

JOSEPH A. VOGEL.